(12) United States Patent
Bushey et al.

(10) Patent No.: US 7,065,201 B2
(45) Date of Patent: Jun. 20, 2006

(54) TELEPHONE CALL PROCESSING IN AN INTERACTIVE VOICE RESPONSE CALL MANAGEMENT SYSTEM

(75) Inventors: Robert R. Bushey, Cedar Park, TX (US); Yanira Marbella Bowen, South Pasadena, CA (US); Ruth Elaine Lawrence, Los Angeles, CA (US); John Mills Martin, Austin, TX (US); Denise Quackenbush, Danville, CA (US); Rachel Beth Simon, Walnut Creek, CA (US)

(73) Assignees: SBC Technology Resources, Inc., Austin, TX (US); SBC Services, Inc., San Antonio, TX (US); Pacific Bell Telephone, San Francisco, CA (US)

( * ) Notice: Subject to any disclaimer, the term of this patent is extended or adjusted under 35 U.S.C. 154(b) by 883 days.

(21) Appl. No.: 09/917,746

(22) Filed: Jul. 31, 2001

(65) Prior Publication Data
US 2003/0026409 A1   Feb. 6, 2003

(51) Int. Cl.
H04M 3/00 (2006.01)
H04M 1/64 (2006.01)

(52) U.S. Cl. .............................. 379/265.01; 379/88.01; 379/88.18

(58) Field of Classification Search . 379/265.01–266.1, 379/88.01, 88.17
See application file for complete search history.

(56) References Cited

U.S. PATENT DOCUMENTS

| | | | |
|---|---|---|---|
| 4,310,727 A | 1/1982 | Lawser et al. | |
| 4,694,483 A | 9/1987 | Cheung | |
| 4,761,542 A | 8/1988 | Kubo et al. | |
| 4,922,519 A | 5/1990 | Daudelin | |
| 4,964,077 A | 10/1990 | Eisen et al. | |
| 5,115,501 A | 5/1992 | Kerr | |
| 5,204,968 A | 4/1993 | Parthasarathi | |
| 5,206,903 A | 4/1993 | Kohler et al. | |
| 5,263,167 A | 11/1993 | Conner, Jr. et al. | |
| 5,299,260 A | 3/1994 | Shaio | |
| 5,311,422 A | 5/1994 | Loftin et al. | |
| 5,323,452 A | 6/1994 | Dickman et al. | |
| 5,327,529 A | 7/1994 | Fults et al. | |
| 5,329,578 A | * 7/1994 | Brennan et al. | 379/211.03 |
| 5,335,268 A | 8/1994 | Kelly, Jr. et al. | |

(Continued)

OTHER PUBLICATIONS

Kelly, "From Intelligent Call Routing to Intelligent Contact Management," Call Center Solutions, v19, n3, Sep. 2000.
"Call Center Roundup (Buyers Guide)," Teleconnect, Dec. 1998.
"Call Centers: sales, service and competitive advantage," Canadian Business, v70, n2, Feb. 1997.
Foster, "Advanced DEFINITY call centers: Working for you and your customers," AT&T Technology, v9, n2, Summer 1994.

(Continued)

*Primary Examiner*—Fan Tsang
*Assistant Examiner*—Hector Agdeppa
(74) *Attorney, Agent, or Firm*—Greenblum & Bernstein, P.L.C.

(57) ABSTRACT

The present invention relates to a customer call routing menu employing an interactive voice response system (IVR) to process a call in a customer service center. The menu messages are provided in terms of customer tasks to be performed, rather than in terms of corporate units. Further, the menu messages are arranged and played to the caller in the order of the most frequently requested tasks and include terminology commonly used by customers.

24 Claims, 5 Drawing Sheets

---

Customer-Centric Menu Structure.

Main Menu.
If you are calling about your bill, your payments, or your account Information, press 1.
To add, change, or remove an optional service, such as Caller ID or a second line, press 2.
To open or close your account, or to move or reconnect your service, press 3.
To find out how to use our services or to find out about the price and availability of our services, press 4.

Sub-Menu 1.
To find out the balance due on your account, press 1.
To discuss or get information about the long-distance portion of your bill, press 2.
For information about your bill that does not concern long-distance, press 3.
To report a payment or to find out where to make a payment, press 4.

Sub-Menu 2.
To add an optional service, press 1.
To change or remove an optional service, press 2.
For information about your Caller ID equipment, press 3.

Sub-Menu 3.
To open an account, press 1.
To close your account, press 2.
To move your service to another address, press 3.
To change the name on your account, press 4.
To get your service reconnected, press 5.

U.S. PATENT DOCUMENTS

| | | |
|---|---|---|
| 5,335,269 A | 8/1994 | Steinlicht |
| 5,384,831 A * | 1/1995 | Creswell et al. ........ 379/114.05 |
| 5,388,198 A | 2/1995 | Layman et al. |
| 5,420,975 A | 5/1995 | Blades et al. |
| 5,479,488 A | 12/1995 | Lennig et al. |
| 5,495,567 A | 2/1996 | Iizawa et al. |
| 5,500,795 A | 3/1996 | Powers et al. |
| 5,519,772 A | 5/1996 | Akman et al. |
| 5,530,744 A | 6/1996 | Charalambous et al. |
| 5,533,107 A | 7/1996 | Irwin et al. |
| 5,533,119 A | 7/1996 | McCallister et al. |
| 5,535,321 A | 7/1996 | Massaro et al. |
| 5,537,470 A | 7/1996 | Lee |
| 5,561,711 A | 10/1996 | Muller |
| 5,566,291 A | 10/1996 | Boulton et al. |
| 5,586,060 A | 12/1996 | Kuno et al. |
| 5,586,171 A | 12/1996 | McAllister et al. |
| 5,586,219 A | 12/1996 | Yufik |
| 5,594,791 A | 1/1997 | Szlam et al. |
| 5,600,781 A | 2/1997 | Root et al. |
| 5,615,323 A | 3/1997 | Engel et al. |
| 5,657,383 A | 8/1997 | Gerber et al. |
| 5,659,724 A | 8/1997 | Borgida et al. |
| 5,668,856 A | 9/1997 | Nishimatsu et al. |
| 5,675,707 A | 10/1997 | Gorin et al. |
| 5,684,870 A | 11/1997 | Maloney et al. |
| 5,684,872 A | 11/1997 | Flockhart et al. |
| 5,706,334 A | 1/1998 | Balk et al. |
| 5,710,884 A | 1/1998 | Dedrick |
| 5,727,950 A | 3/1998 | Cook et al. |
| 5,729,600 A | 3/1998 | Blaha et al. |
| 5,734,709 A | 3/1998 | DeWitt et al. |
| 5,740,549 A | 4/1998 | Reilly et al. |
| 5,757,644 A | 5/1998 | Jorgensen et al. |
| 5,758,257 A | 5/1998 | Herz et al. |
| 5,771,276 A | 6/1998 | Wolf |
| 5,790,117 A | 8/1998 | Halviatti et al. |
| 5,793,368 A | 8/1998 | Beer |
| 5,802,526 A | 9/1998 | Fawcett et al. |
| 5,806,060 A | 9/1998 | Borgida et al. |
| 5,808,908 A | 9/1998 | Ghahramani |
| 5,809,282 A | 9/1998 | Cooper et al. |
| 5,812,975 A | 9/1998 | Komori et al. |
| 5,819,221 A | 10/1998 | Kondo et al. |
| 5,821,936 A | 10/1998 | Shaffer et al. |
| 5,822,744 A | 10/1998 | Kesel |
| 5,825,856 A | 10/1998 | Porter et al. |
| 5,825,869 A | 10/1998 | Brooks et al. |
| 5,832,428 A | 11/1998 | Chow et al. |
| 5,832,430 A | 11/1998 | Lleida et al. |
| 5,848,396 A | 12/1998 | Gerace |
| 5,864,605 A | 1/1999 | Keshav |
| 5,864,844 A | 1/1999 | James et al. |
| 5,870,308 A | 2/1999 | Dangelo et al. |
| 5,884,029 A | 3/1999 | Brush, II et al. |
| 5,899,992 A | 5/1999 | Iyer et al. |
| 5,903,641 A | 5/1999 | Tonisson |
| 5,923,745 A | 7/1999 | Hurd |
| 5,943,416 A | 8/1999 | Gisby |
| 5,953,406 A | 9/1999 | LaRue et al. |
| 5,974,253 A | 10/1999 | Nahaboo et al. |
| 5,991,735 A | 11/1999 | Gerace |
| 5,999,611 A | 12/1999 | Tatchell et al. |
| 5,999,908 A | 12/1999 | Abelow |
| 6,014,638 A | 1/2000 | Burge et al. |
| 6,016,336 A | 1/2000 | Hanson |
| 6,035,336 A | 3/2000 | Lu et al. |
| 6,044,355 A | 3/2000 | Crockett et al. |
| 6,058,163 A | 5/2000 | Pattison et al. |
| 6,058,179 A | 5/2000 | Shaffer et al. |
| 6,061,433 A | 5/2000 | Polcyn et al. |
| 6,067,538 A | 5/2000 | Zorba et al. |
| 6,088,429 A | 7/2000 | Garcia |
| 6,099,320 A | 8/2000 | Papadopoulos |
| 6,104,790 A | 8/2000 | Narayanaswami |
| 6,128,380 A | 10/2000 | Shaffer et al. |
| 6,134,315 A | 10/2000 | Galvin |
| 6,134,530 A | 10/2000 | Bunting et al. |
| 6,148,063 A | 11/2000 | Brennan et al. |
| 6,157,808 A | 12/2000 | Hollingsworth |
| 6,163,607 A | 12/2000 | Bogart et al. |
| 6,170,011 B1 | 1/2001 | Macleod Beck et al. |
| 6,173,053 B1 | 1/2001 | Bogart et al. |
| 6,201,948 B1 | 3/2001 | Cook et al. |
| 6,212,502 B1 | 4/2001 | Ball et al. |
| 6,236,955 B1 | 5/2001 | Summers |
| 6,236,990 B1 | 5/2001 | Geller et al. |
| 6,263,051 B1 * | 7/2001 | Saylor et al. ............ 379/88.17 |
| 6,263,052 B1 | 7/2001 | Cruze |
| 6,269,153 B1 | 7/2001 | Carpenter et al. |
| 6,278,976 B1 | 8/2001 | Kochian |
| 6,282,404 B1 | 8/2001 | Linton |
| 6,295,551 B1 | 9/2001 | Roberts et al. |
| 6,330,326 B1 | 12/2001 | Whitt |
| 6,332,154 B1 | 12/2001 | Beck |
| 6,349,290 B1 | 2/2002 | Horowitz et al. |
| 6,353,661 B1 | 3/2002 | Bailey, III |
| 6,389,400 B1 | 5/2002 | Bushey et al. |
| 6,389,403 B1 | 5/2002 | Dorak, Jr. et al. |
| 6,389,538 B1 | 5/2002 | Gruse et al. |
| 6,405,159 B1 | 6/2002 | Bushey et al. |
| 6,411,687 B1 | 6/2002 | Bohacek et al. |
| 6,483,523 B1 | 11/2002 | Feng |
| 6,487,277 B1 * | 11/2002 | Beyda et al. ............ 379/88.01 |
| 6,564,197 B1 | 5/2003 | Sahami et al. |
| 6,600,821 B1 * | 7/2003 | Chan et al. ............ 379/265.07 |
| 6,778,651 B1 * | 8/2004 | Jost et al. .............. 379/201.01 |
| 2001/0014146 A1 | 8/2001 | Beyda et al. |
| 2001/0041562 A1 | 11/2001 | Elsey et al. |
| 2002/0076032 A1 | 6/2002 | Rodriguez et al. |
| 2002/0133394 A1 | 9/2002 | Bushey et al. |
| 2003/0143981 A1 | 7/2003 | Kortum et al. |
| 2003/0156706 A1 | 8/2003 | Koehler et al. |
| 2003/0158655 A1 | 8/2003 | Obradovich et al. |
| 2003/0161464 A1 * | 8/2003 | Rodriguez et al. ..... 379/266.01 |
| 2004/0062371 A1 * | 4/2004 | Maropis et al. .......... 379/114.2 |

OTHER PUBLICATIONS

Card, S.K.; Moran, T.P.; and Newell A. (1983). *The Psychology of Human–Computer Interaction*. Hillsdale, NJ: Lawrence Erlbaum.

Hart, S.G.; and Staveland, L.E. (1988). *Development of the NASA–TLX (Task Load Index):Results of Empirical and Theoretical Research*. In P.A. Hancock and N. Meshkati (Eds.), *Human Mental Workload*. (pp. 139–183).

John, B.E.; and Kieras, D.E. (1996). Using GOMS for User Interface Design and Evaluation: Which technique? *ACM Transactions on Computer–Human Interaction*, 3 (4). 287–319.

Shingledecker, C.A. (1980). Operator Strategy: A Neglected Variable in Workload Assessment. *The American Psychological Association, Division 21 Symposium on "Mental Workload Measurement: The Theory Application Interface."* Montreal, Quebec, Canada: American Psychological Association.

Wei, Z.G. (1997). *Mental Load and Performance at Different Automation Levels*. The Netherlands: Delft University. Applicants partiularly call the Examiner's attention to pp. 28–38 of this document.

Wierwille, W.W. and Eggemeier, F.T. (1993). Recommendations for Mental Workload Measurement in a Test and Evaluation Environment. *Human Factors*, 35 (2), 263–281.

ACD Learning Center Tutorial Series, ACD Call Center Online Learning Center, <http://www.call–center.net/ivr–series.htm>.

"Customer Management Technology", TeleTech, <http://www.teletech.com/solutions/cmt.htm>, printed on Dec. 18, 2001.

"Products & Services—Interactive Voice Response (IVR)", Prairie Systems, <http://www.prairiesys.com/PSI/p_s_interactive_sol.htm>.

"RVS Voice", iMessaging Systems, Inc., <http://www.imessagingsystems.com/imsprods/rvsvoice/resvoice.htm>.

"What's Next in Interactive Voice Response", International Nortel Networks Meridian Users Group, <http://www.innmug.org/information/kirvan.html>, which was published in the Dec., 2000 issue of *InnTouch*.

"PADIS—An Automatic Telephone Switchboard and Directory Information System" by A. Kellner et al. published in *Speech Communication*, Oct. 1997, together with a list of papers and publications by Andreas Kellner that appears to provide publication date information for articles by Andreas Kellner.

"Natural Language Call Routing: A Robust, Self–Organising Approach" by Bob Carpenter & Jennifer Chu–Carroll, Lucent Technologies Bell Laboratories (1998), together with a CiteSeer citation.

"Lucent Technologies announces trial on natural language call routing technology for USAA"—a press release dated Dec. 3, 1997.

INSPEC abstract of "A Spoken Language Ssystem for Aautomated Call Routing" published 1997 IEEE International Conference on Acoustics, Speech, and Signal Processing by G. Riccardi et al., AT&T Bell Labs.

Ameritech Corp., "Ameritech Phone–Based UI Standards: Dialogue Design", <http://www.ameritech.com/corporate/testtown/library/standard/pbix4.html>, 1998.

InterVoiceBrite, Inc., "AgentConnect Call Center Platform Brochure", no date available.

Henry Lieberman et al., "Let's Browse: A Collaborative Web Browsing Agent", Jan. 5–8, 1999. Proceedings of IUI 99, CPP Conference Paper, 5 pages, including a Dialog DataStar Abstract thereof.

* cited by examiner

PRIOR ART

Business-Centric Menu Structure.

Main Menu.
For the ordering department, press 1.
For the billing department, press 2.
For the repair department, press 3.
For revenue management department, press 4.

Sub-Menu 1.
For the phone service group, press 1.
For the DSL group, press 2.

Sub-Menu 2.
(no sub-menu items)

Sub-Menu 3.
For the repair group, press 1.
For the technician scheduling group, press 2.
For the technician re-schedule group, press 3.

Sub-Menu 4.
(no sub-menu items)

FIG. 1

Customer-Centric Menu Structure.

Main Menu.
If you are calling about your bill, your payments, or your account information, press 1.
To add, change, or remove an optional service, such as Caller ID or a second line, press 2.
To open or close your account, or to move or reconnect your service, press 3.
To find out how to use our services or to find out about the price and availability of our services, press 4.

Sub-Menu 1.
To find out the balance due on your account, press 1.
To discuss or get information about the long-distance portion of your bill, press 2.
For information about your bill that does not concern long-distance, press 3.
To report a payment or to find out where to make a payment, press 4.

Sub-Menu 2.
To add an optional service, press 1.
To change or remove an optional service, press 2.
For information about your Caller ID equipment, press 3.

Sub-Menu 3.
To open an account, press 1.
To close your account, press 2.
To move your service to another address, press 3.
To change the name on your account, press 4.
To get your service reconnected, press 5.

FIG. 2

| ITEM | DESCRIPTION | FREQUENCY | CUMULATIVE FREQUENCY |
|---|---|---|---|
| 1 | Get information about a bill | 17.8% | |
| 2 | Add optional services | 9.3% | |
| 3 | Get new service / open an account | 9.0% | |
| 4 | How to use ... | 6.7% | 42.8% |
| 5 | Disconnect optional service | 6.6% | |
| 6 | Report a problem with service | 6.2% | |
| 7 | Change optional service | 6.0% | |
| 8 | Disconnect service / close account | 5.3% | 66.9% |
| 9 | Get information on services (availability, S) | 4.8% | |
| 10 | Schedule a payment | 3.9% | |
| 11 | Change account information | 3.8% | |
| 12 | Move service | 3.4% | 82.8% |
| 13 | Get information on account | 2.7% | |
| 14 | Discuss bill | 2.1% | |
| 15 | Get information on payment | 1.7% | |
| 16 | Schedule technician visit | 1.2% | 90.5% |

FIG. 4

TELEPHONE CALL PROCESSING IN AN INTERACTIVE VOICE RESPONSE CALL MANAGEMENT SYSTEM

BACKGROUND OF THE INVENTION

1. Field of the Invention

The present invention relates to the field of telecommunications. More particularly, the present invention relates to a customer call routing menu employing an interactive voice response (IVR) system.

2. Acronyms

The written description provided herein contains acronyms which refer to various telecommunications services, components and techniques, as well as features relating to the present invention. Although some of these acronyms are known, use of these acronyms is not strictly standardized in the art. For purposes of the written description herein, acronyms will be defined as follows:

Automatic Number Identification (ANI)
Customer Task Frequency (CTF)
Dual Tone Multi Frequency (DTMF)
Interactive Voice Response (IVR)

3. Description of Background Information

Many companies incorporate IVR call management systems in order to handle and route incoming telephone calls. This is especially true within customer service centers, also known as customer call centers, of companies. Typically, the IVR system plays an audible menu to the caller providing messages consisting of call routing options. The caller is then prompted to select from the call routing options. Often, the IVR system includes a main menu and one or more sub-menus. A caller is then required to navigate through the various levels of menus to reach a customer service representative that may provide assistance.

Until now, the IVR call management menus have been designed from a business-centric standpoint. That is, the design of IVR menus has been in part based upon the subjective judgment and experience of those persons directly involved in the management of customer service centers. Their perspective is, quite naturally, oriented towards the organization and how the people within the organization will assist the customer. For example, menu message options have been structured using corporate department designations, e.g., billing department, repair group, etc. The order in which the departments are arranged in the menu may be influenced by a variety of factors including company hierarchy. As a result, callers may have to listen to many, if not all, of the menu message options before deciding upon an option to select. In some instances, the caller makes an incorrect selection and is routed to a service representative not able to assist them in accomplishing their task. This leads to caller dissatisfaction and frustration, as well as the added cost of transferring the call to the appropriate service representative.

Some IVRs customize the menu for a particular caller, using for instance, automatic number identification (ANI). One example of an IVR system that uses ANI to identify the caller and individualize the menu was presented by POLCYN et al., U.S. Pat. No. 6,061,433. However, POLCYN et al., has many drawbacks, particularly with respect to customer service centers of telecommunications carriers. The nature of customer service centers for telecommunications carriers is not well suited to individualizing the menu for a particular caller because customer service centers for telecommunications carriers receive few repeat callers. Moreover, callers that do call back are usually calling for reasons unrelated to the previous call, e.g., to request a different service. Furthermore, individualizing the menu based upon a particular caller requires extra processing and places additional demands upon the system.

It has been observed that most customers call a customer service center number with a specific task in mind, not an organizational unit. As a result, it would be desirable to have a customer-centric IVR for call management that improves customer satisfaction. The present invention overcomes the problems associated with the prior art.

BRIEF DESCRIPTION OF THE DRAWINGS

The present invention is further described in the detailed description that follows, by reference to the noted plurality of drawings by way of non-limiting examples of embodiments of the present invention, in which like reference numerals represent similar parts throughout several views of the drawings, and in which:

FIG. 1 is an exemplary menu structure of a prior art interactive voice response system;

FIG. 2 is an exemplary menu structure of an interactive voice response system, according to an aspect of the present invention;

DETAILED DESCRIPTION OF THE EMBODIMENTS

Figure 3:
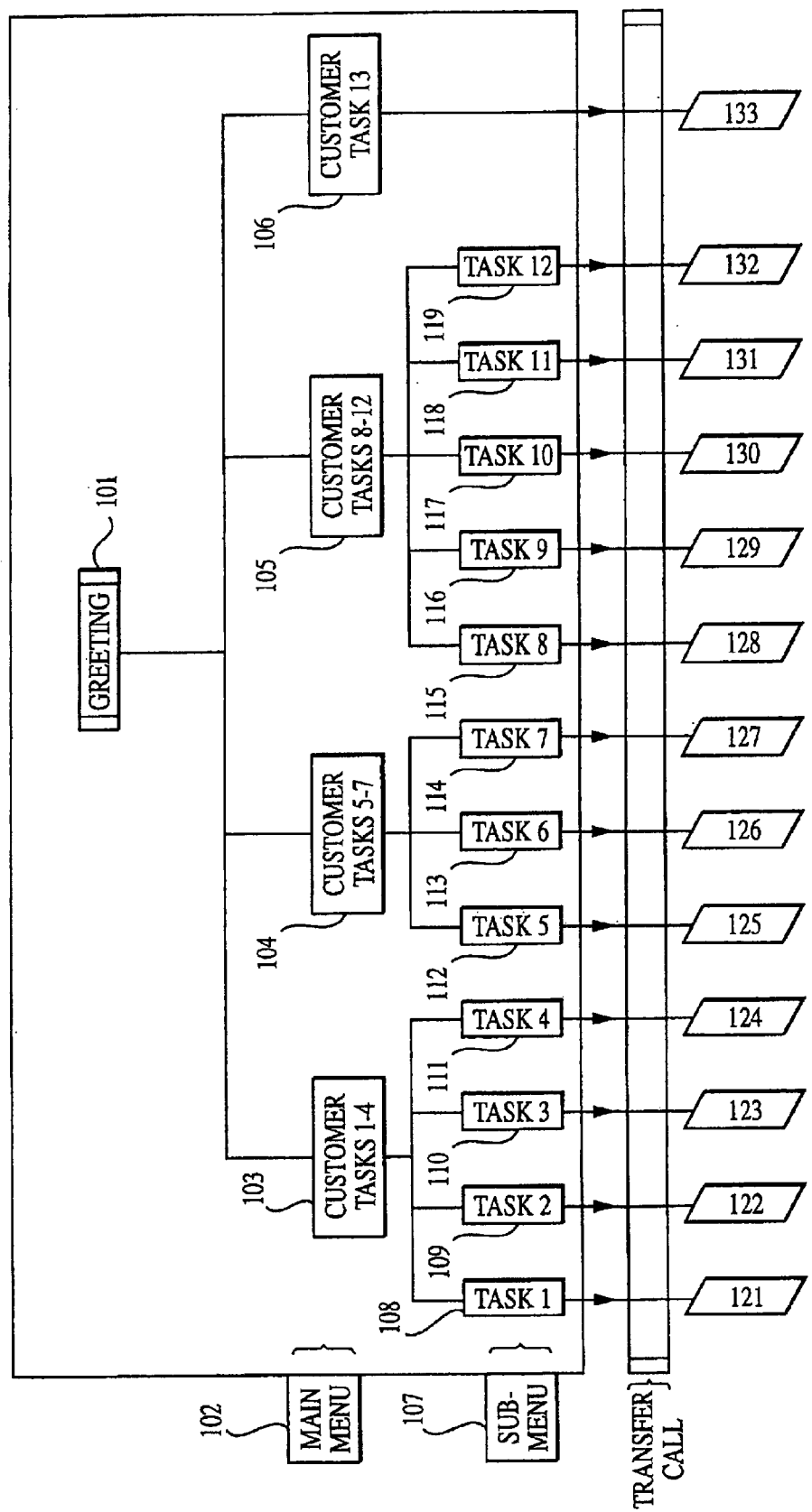
FIG. 3 is an exemplary menu structure of a customer-centric IVR call management system, according to an aspect of the present invention FIG. 4 an exemplary customer task frequency table, according to an aspect of the present invention.

In view of the foregoing, the present invention, through one or more of its various aspects and/or embodiments is thus presented to provide a customer call routing menu for an IVR call management system.

Accordingly, one aspect of the present invention is to provide a method for processing a telephone call placed to an interactive voice response system of a customer service center of a telecommunications carrier. The method includes receiving a call from a caller and presenting a sequence of menu messages to the caller that represent caller tasks. The sequence of menu messages are arranged in an order so that more frequently requested tasks are played to the caller before less frequently requested tasks are played to the caller. The method also includes prompting the caller to select from one of the menu messages and routing the call in accordance with the caller's selection.

The method may include presenting a main menu to the caller and at least one sub-menu to the caller. At least one of the menu messages could be associated with a customer bill or payment. Another menu message may be associated with adding, changing, or removing an optional service. Yet another menu message may be associated with opening or closing an account. Further, another menu message could be related to moving or reconnecting telephone service or about obtaining information concerning telephone services.

Another aspect of the present invention is to provide a method for processing a telephone call placed to an interactive voice response system of a customer service center of a telecommunications carrier. The method includes receiving a call from a caller and presenting a sequence of main menu messages to the caller. At least one of the menu messages represent groups of customer tasks. The method further includes prompting the caller to select from one of the main menu messages and presenting a sequence of sub-menu messages to the caller. The method also includes prompting the caller to select from one of the sub-menu messages and routing the call in accordance with the caller's selection.

The method may include presenting a sequence of main menu messages in an order so that more frequently requested tasks are played to the caller before less frequently requested tasks are played to the caller. The method may further include presenting the sequence of sub-menu messages in an order so that more frequently requested tasks are played to the caller before less frequently requested tasks are played to the caller. At least one of the sub-menu messages may represent groups of customer tasks.

The method may include presenting a main menu to the caller and at least one sub-menu to the caller. At least one of the menu messages could be associated with a customer bill or payment. Another menu message may be associated with adding, changing, or removing an optional service. Yet another menu message may be associated with opening or closing an account. Further, another menu message could be related to moving or reconnecting telephone service or about obtaining information concerning telephone services.

Another aspect of the present invention is to provide a telecommunications system for receiving telephone calls at a customer service center. The system includes an interactive voice response unit that provides at least one menu of messages representing customer tasks requested by customers. The menu is arranged in an order so that more frequently requested tasks are played to the caller before less frequently requested tasks are played to the caller. Further, the caller is prompted to select a menu message and the call is routed in accordance with the caller's selection.

The selection of a menu message by a caller may cause a sub-menu to be presented to the caller, in which the sub-menu includes a sequence of menu messages. The selection of a menu message by a caller may also cause the call to be transferred to a customer service representative.

Another aspect of the present invention is to provide a computer readable medium for storing a computer program that processes a telephone call in an interactive voice response system. The computer readable medium includes a presenting source code segment that presents a sequence of menu messages to the caller that represent caller tasks. The sequence of menu messages are arranged in an order so that more frequently requested tasks are played to the caller before less frequently requested tasks are played to the caller. The computer readable medium also includes a prompting source code segment that prompts the caller to select from one of the menu messages. Further, the computer readable medium includes a routing source code segment that routes the call in accordance with the caller's selection.

The presenting source code segment of the computer readable medium may present a main menu to the caller and at least one sub-menu to the caller. Further, the presenting source code segment may present a sub-menu to the caller in response to the routing code segment's routing of the call in accordance with the caller's selection from the main menu. The routing source code segment may transfer the caller to a customer service representative. Further, the presenting source code segment may present at least one sub-menu to the caller in response to the caller's selection from another sub-menu.

The present invention relates to telephone call processing in an IVR call management system. In one embodiment, the IVR call management system of the present invention is directed to function in a customer service center for a telecommunications carrier. The IVR call management system supports a menu that is organized by customer tasks and is worded with terminology commonly used by customers. Further, the order of the menu messages in the IVR call management system is based upon the frequency of the tasks requested by customers. This approach to menu design is referred to as customer-centric.

FIG. 1 illustrates a business-centric menu structure for an IVR that is found in the prior art. The caller is presented with the following menu messages in the main menu: "For the ordering department, press 1"; "For the billing department, press 2"; "For the repair department, press 3"; "For the revenue management department, press 4". If the caller selects "1" from the main menu, sub-menu 1 prompts the caller as follows: "For the phone service group, press 1" and "For the DSL group, press 2". As a result of the caller's selection in sub-menu 1, the call is transferred to the identified group, i.e., the phone service group or the DSL group. If the caller selects "2" from the main menu, the caller is transferred to the billing department. If the caller selects "3" from the main menu, sub-menu 3 prompts the caller as follows: "For the repair group, press 1"; "For the technician scheduling group, press 2"; and "For the technician re-schedule group, press 3". As a result of the caller's selection in sub-menu 3, the call is transferred to the identified group, i.e., the repair group, the technician scheduling group, or the technician re-scheduling group. If the caller selects "4" from the main menu, the caller is transferred to the revenue management group.

FIG. 2 illustrates an exemplary embodiment of the present invention according to a customer-centric menu structure. In one embodiment, the IVR call management system employs the Nortel Networks Periphonics Voice Processing Series Information Server VPS/is2 model. The IVR call management system may use Periphonics Operating System 5.3-1 (or higher version) running on a Sparc workstation available from Sun Microsystems, Inc. The Sparc workstation may be equipped, for example, with Sun Operating System 5.6 (or higher version). In FIG. 2, the caller is presented with the following audible menu messages in the main menu: "If you are calling about your bill, your payments, or your account information, press 1"; "To add, change, or remove an optional service, such as Caller ID or a second line, press 2"; "To open or close your account, or to move or reconnect your service, press 3"; and "To find out how to use our services or to find out about the price and availability or our services, press 4".

If the caller selects "1" from the main menu, sub-menu 1 prompts the caller as follows: "To find out the balance due on your account, press 1"; "To discuss or get information about the long-distance portion of your bill, press 2"; "For information about your bill that does not concern long-distance, press 3"; and "To report a payment or to find out where to make a payment, press 4". As a result of the caller's selection in sub-menu 1, the call is transferred to a customer service representative capable of assisting the customer with the identified task, i.e., obtaining account balance information, obtaining billing information for long distance calls, obtaining billing information for non-long distance calls, or obtaining payment information.

If the caller selects "2" from the main menu, sub-menu 2 prompts the caller as follows: "To add an optional service, press 1"; and "To change or remove an optional service, press 2"; "For information about your Caller ID equipment, press 3". As a result of the caller's selection in sub-menu 2, the call is transferred to a customer service representative capable of assisting the customer with the identified task, i.e., adding an optional service, changing or removing an optional service, or obtaining information about caller ID equipment.

If the caller selects "3" from the main menu, sub-menu 3 prompts the caller as follows: "To open an account, press 1"; "To close your account, press 2"; "To move your service to another address, press 3"; "To change the name on your account, press 4"; and "To get your service reconnected, press 5". As a result of the caller's selection in sub-menu 3, the call is transferred to a customer service representative capable of assisting the customer with the identified task, i.e., opening an account, closing an account, moving an account, changing the name on an account, or reconnecting service.

If the caller selects "4" from the main menu, the call is transferred to a customer service representative capable of assisting the customer. In all cases, the design of the customer-centric menu structure causes the call to be transferred to a customer service representative trained to assist the caller with the particular task selected by the caller.

As shown in FIG. 2, the sequence of main message options may include groups of related tasks or individual tasks. It is preferred that each sub-menu message option includes individual tasks; although, in the alternative a sub-menu message may include groups of related tasks. In cases where a sub-menu message includes groups of related tasks, additional levels of sub-menus may be provided. The possible menu messages are not intended to be limited to those shown, but may include others as circumstances warrant. The determination of which messages are used in the menus will be discussed herein later.

In an embodiment, the menu messages in the main menu and sub-menus are arranged in the order of the most frequently requested tasks, with the most frequently requested tasks presented first. The determination of which tasks are most frequently requested will be described herein later.

FIG. 3 illustrates an exemplary menu structure of a customer-centric IVR call management system of the present invention. An incoming call to the customer service center is received by the IVR call management system and a greeting message is played to the caller at block 101. At block 102, a main menu is played to the caller including menu messages identifying various groups of tasks and an individual task from which to choose. A group of tasks is defined as more than one task. An individual task is defined as a single task. Examples of various groups of tasks and individual tasks were discussed with reference to FIG. 2. The groups of tasks are represented by blocks 103, 104, and 105. Block 103 includes group of tasks 1, 2, 3 and 4; block 104 includes group of tasks 5, 6, and 7; and block 105 includes group of tasks 8, 9, 10, 11 and 12. Block 106 includes an individual task 13.

The main menu 102 prompts the caller to select one of the groups of tasks (blocks 103, 104, 105) or the individual task (block 106). If the caller selects group of tasks 1 through 4 (block 103), a sub-menu 107 is played to the caller including menu messages of individual tasks associated with task 1 through 4, from which to choose. The sub-menu 107 prompts the caller to select from individual tasks 1 through 4, which are represented by blocks 108, 109, 110 and 111. It is clear that a different sub-menu is played to the caller based upon whether the caller selects block 103, 104, or 105 in the main menu. If the caller selects task 1 (block 108), the call is transferred to a service representative at block 121. If the caller selects task 2 (block 109), the call is transferred to a service representative at block 122. If the caller selects task 3 (block 110), the call is transferred to a service representative at block 123. If the caller selects task 4 (block 111), the call is transferred to a service representative at block 124.

If at the main menu 102, the caller selects group of tasks 5–7 (block 104) a sub-menu 107 is played to the caller including menu messages of individual tasks associated with group of tasks 5 through 7, from which to choose. The sub-menu 107 prompts the caller to select from individual tasks 5 through 7, which are represented by blocks 112, 113 and 114. If the caller selects task 5 (block 112), the call is transferred to a service representative at block 125. If the caller selects task 6 (block 113), the call is transferred to a service representative at block 126. If the caller selects task 7 (block 114), the call is transferred to an service representative at block 127.

If at the main menu 102, the caller selects group of tasks 8–12 (block 105) a sub-menu 107 is played to the caller comprising menu messages of individual tasks associated with group of tasks 8 through 12, from which to choose. The sub-menu 107 prompts the caller to select from individual tasks 8 through 12, which are represented by blocks 115, 116, 117, 118 and 119. If the caller selects task 8 (block 115), the call is transferred to a service representative at block 128. If the caller selects task 9 (block 116), the call is transferred to a service representative at block 129. If the caller selects task 10 (block 117), the call is transferred to a service representative at block 130. If the caller selects task 11 (block 118), the call is transferred to an service representative at block 131. If the caller selects task 12 (block 119), the call is transferred to a service representative at block 132.

If at the main menu 102, the caller selects individual task 13 (block 106), no sub-menu is played and the caller is transferred to a service representative at block 133.

FIG. 4 is an exemplary customer task frequency (CTF) table of the present invention. In order to design a customer-centric menu, as previously discussed with reference to FIGS. 2 and 3, a large random sample of customer tasks is compiled, preferably by customer service representatives, who record the nature of various caller requests over a given period of time. Generally, the caller's request is recited in the caller's opening statement. For instance, a caller may say "I need to get information about a bill" or "I would like to schedule a payment", etc. A random sample of 2500 customer requests is used to construct the CTF table; although, any sufficiently large random sample may be used. Next, the identified tasks are classified into groups of tasks that are generally related. For instance, all tasks concerning a statement of account or billing inquiry would logically constitute one group. Next, the individual tasks are recorded on the CTF table. The CTF table is the basis for designing the customer-centric menu in that it is used for identifying what is included in the menu items. Further, the CTF table is used for identifying the sequence of menu items, i.e., presenting the most frequently requested tasks first.

For example, referring to FIG. 4, callers desiring to get information about a bill represented 17.8% of the tasks demanded in the particular sample, the most frequently requested task. Therefore, a group of tasks associated with billing would be played first in the main menu. Further, getting information about a particular bill would be played first in the sub-menu. Also in this sample, callers wishing to add optional services represented 9.3% of the tasks demanded in the sample, i.e, the second most frequently requested task. Therefore, a group of tasks associated with adding, changing, or removing an optional service would be the second message played in the main menu to callers. Since adding an optional service was requested more frequently than changing or removing an optional service, it would be played first in the sub-menu. The process of designing the menu structure as a function of the frequency with which the tasks are requested continues until all of the tasks listed in the CTF have been allocated in the menu structure.

Additionally, the CTF table is used for identifying the terminology of words to be used in the menu messages, i.e., the language used by the customers. To assure that the callers can identify with the menu messages, the caller's actual choice of words obtained from the random sample is used in the CTF table, and subsequently, in the menu messages.

Over time, the demands of callers change and the services offered by the telecommunications carrier evolves. Thus, the process of conducting a random sample of callers and constructing the CTF table is repeated periodically.

Figure 5:
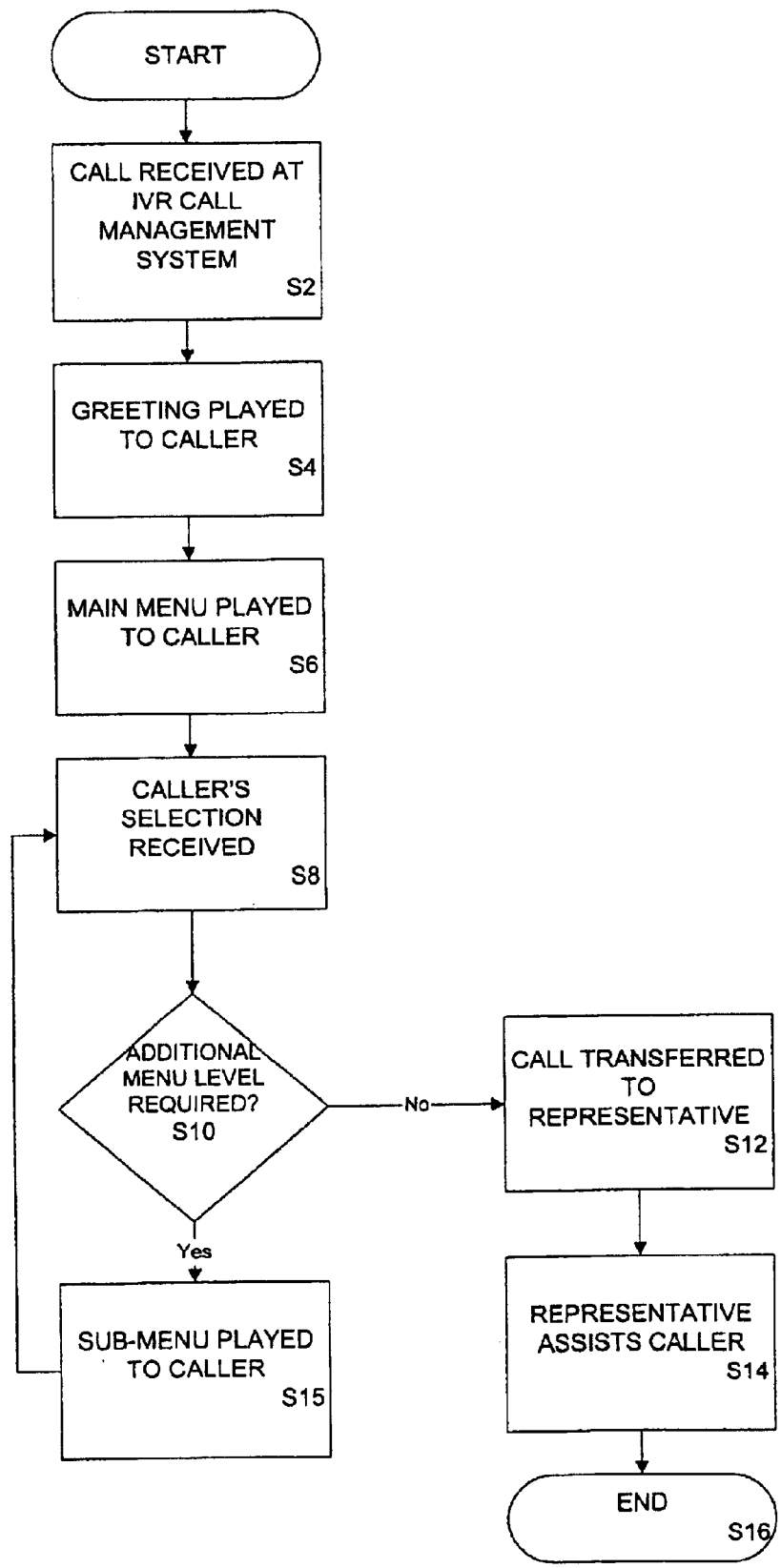
FIG. 5 is an exemplary flowchart diagram of a call processed in an interactive voice response system, according to an aspect of the present invention.

FIG. 5 shows an exemplary flowchart diagram of a call processed in the IVR call management system, according to an aspect of the present invention. At step s2, a call is received at the IVR call management system. A greeting is played to the caller at step s4. At step s6, the main menu is played to the caller and the caller is prompted to select from a group of menu messages. The caller's selection is received at step s8. At step s10, a determination is made as to whether an additional menu level should be presented to the caller.

If a "no" determination is made at step s10, the caller is transferred to the appropriate service representative at step s12 and the caller is assisted at step s14. The call is terminated at step s16. In general, if the caller selects a menu message that includes an individual task rather than a group of tasks, the call will be transferred to the appropriate customer service representative. However, if the caller selects a menu message that comprises a group of tasks, a sub-menu will be played to the caller. If a "yes" determination is made at step s10, a sub-menu is presented to the caller at step s15 and the caller's selection is received at step s8. The loop continues until a "no" determination is made at step s10, at which time the caller is transferred to a service representative at step s12 for assistance.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims. For instance, it should be understood that callers may select menu messages via any means including DTMF input or spoken word.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to E-mail or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards, including standards for the IVR system, represent examples of the state of the art. Such standards are periodically superseded by faster or more efficient equivalents having essentially the same functions. Accordingly, replacement standards and protocols having the same functions are considered equivalents.

What is claimed is:

1. A method of processing a telephone call placed to an interactive voice response system of a customer service center of a telecommunications carrier, comprising:
   receiving a call from a caller;
   presenting a sequence of menu messages to the caller that represen caller tasks, the tasks having been identified during a set of selected calls received at the customer service center, and recorded in a customer task frequency table with terminology spoken by callers of the selected calls, the sequence of menu messages being arranged in an order so that more frequently requested tasks are played to the caller before less frequently requested tasks are played to the caller, the menu messages comprising the terminology spoken by the callers of the selected calls;
   prompting the caller to select from one of the menu messages; and
   routing the call in accordance with the caller's selection.

2. The method according to claim 1, wherein the method further comprises presenting a main menu to the caller and at least one sub-menu to the caller.

3. The method according to claim 1, wherein at leas one of the menu messages is associated with a customer bill or payment.

4. The method according to claim 1, wherein at leas one of the menu messages is associated with adding, changing, or removing an optional service.

5. The method according to claim 1, wherein at leas one of the menu messages is associated with opening or closing an account.

6. The method according to claim 1, wherein at leas one of the menu messages is associated with moving or reconnecting telephone service.

7. The method according to claim 1, wherein at leas one of the menu messages is associated with obtaining information about telephone services.

8. A method of processing a telephone call placed to an interactive voice response system of a customer service center of a telecommunications carrier, comprising:

receiving a call from a caller;

presenting a sequence of main menu messages to the caller, at least one of the menu messages representing groups of customer tasks, the tasks having been identified during a set of selected calls received at the customer service center, and recorded in a customer task frequency table with terminology spoken by callers of the selected calls;

prompting the caller to select from one of the main menu message;

presenting a sequence of sub-menu messages to the caller;

prompting the caller to select from one of the sub-menu messages; and routing the call in accordance with the caller's selection, wherein the main menu messages and sub-menu messages comprise the terminology spoken by the callers of the selected calls.

9. The method according to claim 8, wherein the sequence of main menu messages are arranged in an order so that more frequently requested task are played to the caller before less frequently requested tasks are played to the caller.

10. The method according to claim 8, wherein the sequence of sub-menu messages are arranged in an order so that more frequently requested task are played to the caller before less frequently requested tasks are played to the caller.

11. The method according to claim 8, wherein at least one of the sub-menu messages represents groups of customer tasks.

12. The method according to claim 8, wherein at lea t one of the main menu messages is associated with a customer bill or payment.

13. The method according to claim 8, wherein at least one of the main menu messages is associated with adding, changing, or removing an optional service.

14. The method according to claim 8, wherein at least one of the main menu messages is associated with opening or closing an account.

15. The method according to claim 8, wherein at least one of the main menu messages is associated with moving or reconnecting telephone service.

16. The method according to claim 8, wherein at least one of the main menu messages is associated with obtaining information about telephone services.

17. A telecommunications system for receiving telephone calls at a customer service center, said telecommunications system comprising:

an interactive voice response unit that provides at least one menu of messages representing customer tasks requested by customers, said at least one menu being arranged in an order so that more frequently requested tasks are played to the caller before less frequently requested tasks are played to the caller, the tasks having been identified during a set of selected calls received at the customer service center, and recorded in a customer task frequency table with terminology spoken by callers of the selected calls, wherein the caller is prompted to select a menu message and the call is routed in accordance with the caller's selection, the menu message comprising the terminology spoken by the callers of the selected calls.

18. The telecommunications system according to claim 17, wherein the selection of a menu message by a caller causes a sub-menu to be presented to the caller, the sub-menu comprising a sequence of menu messages.

19. The telecommunications system according to claim 17, wherein the selection of a menu message by a caller causes the call to be transferred to a customer service representative.

20. A computer readable medium for storing a computer program that processes a telephone call in an interactive voice response system, said medium comprising:

a presenting source code segment that presents a sequence of menu messages to the caller that represent caller tasks, said sequence of menu messages being arranged in an order so that more frequently requested tasks are played to the caller before less frequently requested tasks are played to the caller, the tasks having been identified during a set of selected calls received at the customer service center, and recorded in a customer task frequency table with terminology spoken by the callers of the selected calls;

a prompting source code segment that prompts the caller to select from one of said menu messages, the menu messages comprising the terminology spoken by the callers of the selected calls; and a routing source code segment that routes the call in accordance with the caller's selection.

21. The computer readable medium according to claim 20, wherein the presenting source code segment presents a main menu to the caller and at least one sub-menu to the caller.

22. The computer readable medium according to claim 20, wherein the presenting source code segment presents a sub-menu to the caller in response to the routing code segment routing the call in accordance with the caller's selection from the main menu.

23. The computer readable medium according to claim 20, wherein the routing source code segment transfers the caller to a customer service representative.

24. The computer readable medium according to claim 21, wherein the presenting source code segment presents at least one sub-menu to the caller in response to the caller's selection from another sub-menu.

* * * * *